April 4, 1939. W. B. SWINDELL 2,152,777
INDICATOR MECHANISM FOR EDUCATIONAL PURPOSES
Filed July 25, 1938 2 Sheets-Sheet 1
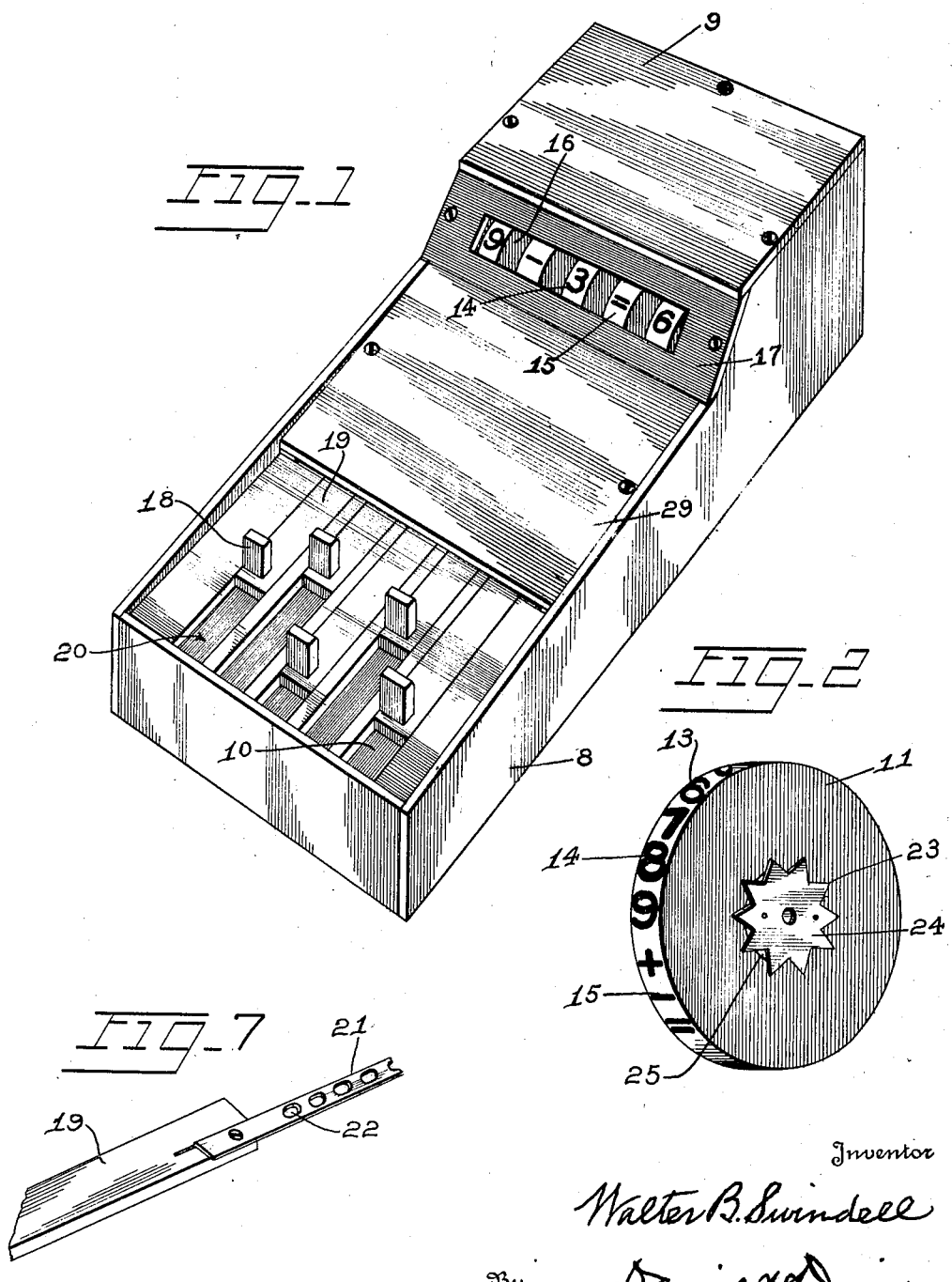
Inventor
Walter B. Swindell
By Davis & Davis
Attorneys April 4, 1939. W. B. SWINDELL 2,152,777
INDICATOR MECHANISM FOR EDUCATIONAL PURPOSES
Filed July 25, 1938 2 Sheets-Sheet 2
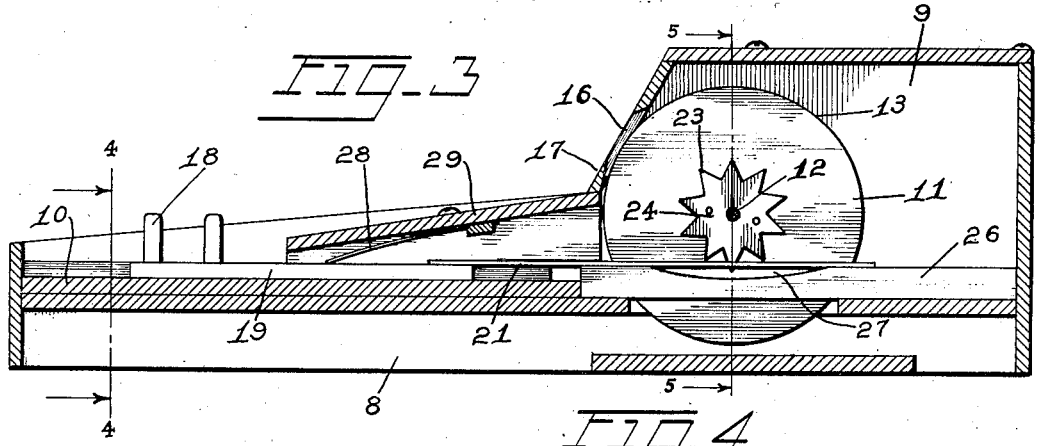
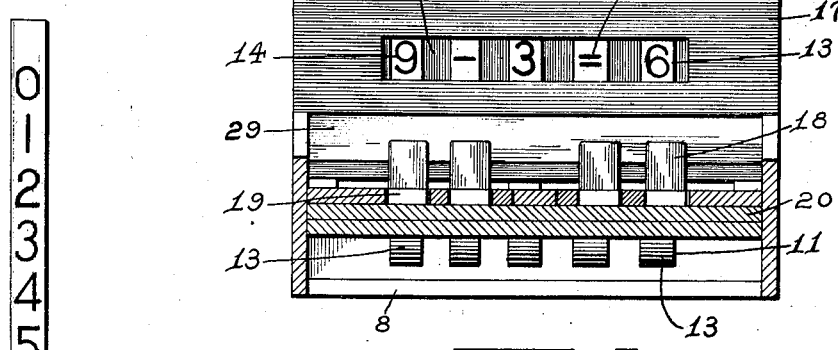
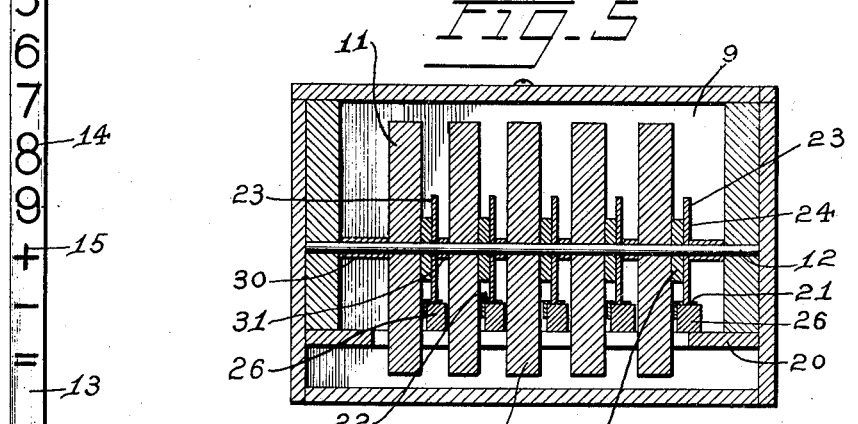
Inventor
Walter B Swindell
By Davis & Davis
Attorneys Patented Apr. 4, 1939

2,152,777

UNITED STATES PATENT OFFICE 2,152,777

INDICATOR MECHANISM FOR EDUCATIONAL PURPOSES

Walter B. Swindell, Columbia, S. C.

Application July 25, 1938, Serial No. 221,175

10 Claims. (Cl. 35—77)

The present invention relates to an indicator mechanism for educational purposes and consists in the combinations and arrangements of elements hereinafter described and particularly set forth in the accompanying claims.

The purpose of the invention is to provide an indicator mechanism of simple construction for teaching youth in elementary grades wherein the child himself may actually play an active part in working the medium employed for imparting his instruction, and a further purpose is to provide a device of this kind of simple construction to the end that it may be readily operated by the tutored child without requiring any appreciable assistance or help from the teacher.

A further purpose of the invention is to provide an indicator mechanism of this character which is suitable for imparting instruction in the rudiments of letters or numbers and in such a way as to strongly impress the same upon the child's mind. That is to say, the idea here proposed contemplates imparting knowledge to the child through his senses of both touch and sight, and thereby catering to the desire of every normal child to both see objects in motion and himself create that motion, thus utilizing to the fullest extent this desired objective of all pedagogy, i. e., leaving a pleasant impression in the minds of children and make them learn with appreciable speed.

A further object of the invention is to produce a medium which will easily and clearly impress on the child's mind the shapes and forms of letters and numerals and various combinations of these. Thus it is here contemplated to initially and fundamentally teach the letters of the alphabet, the spelling of simple words, the characters of numerals and simple problems therein by way of addition and subtraction.

The invention is shown by way of illustration in the accompanying drawings wherein:

Figure 1 is a perspective view of the mechanism or machine complete.

Figure 2 a detailed view of one of the characters carrying discs employed.

Figure 3 a central longitudinal sectional view of the machine.

Figure 4 a transverse sectional view thereof taken on the line 4—4 of Figure 3.

Figure 5 a similar view taken on the line 5—5 of Figure 3.

Figure 6 shows one type of character carrying strip that is mounted on the perimeter of the disc wheel, and;

Figure 7 a detailed view of a portion of the key rack bar for actuating the character disc.

Referring to the construction in further detail and wherein like reference characters designate corresponding parts in the different figures shown, the apparatus or machine comprises a suitable support 8 providing a housing portion 9 at one end for the indicating mechanism, and a keyboard unit at the front end 10 for actuating the same, the whole being within appreciably small dimensions and of simple construction so as to be manufactured in large quantities and at small cost. A further objective is that the simplicity of the operating mechanism is such that it may be readily assembled or dis-assembled and will not easily get out of order.

The indicator mechanism comprises essentially a plurality of discs or wheels 11 journalled in spaced relation on a shaft 12 (Figures 2 and 5) and while five of said disc wheels are illustrated it will be understood that a lesser or larger number thereof may be employed as desired. The several disc wheels 11 are provided on their perimeters with strips 13 having numeral markings 14 as shown and likewise there is shown symbols of "plus, minus and equals," 15 as indicated in Figures 2 and 6. Said characters when selected are clearly visible through the opening or window 16 formed in the cover plate 17 as indicated in Figure 1.

The means for actuating the discs through the several key pieces 18 comprises a plurality of key bars 19 that are reciprocally mounted on the base or shelf portion 20 of the casing, and each of said bars connects at its rear end with a straight and horizontal metal strip 21 formed with a series of openings or apertures 22 designed to have gearing engagement with the teeth 23 of a disc piece or pinion 24 secured to the character disc 11. A spacing member 25 is interposed between the wheel 11 and pinion 24 whereby the teeth 23 may have sufficient clearness from the sides of adjacent discs to give ready and easy engagement with the apertured strip 21 as indicated in Figure 3.

A ledge or strip 26 provides a supporting track for the rear portion of the apertured rack 21, and to afford appropriate clearness for engagement between the rack 21 and pinion 24 said track 26 is cut away or recessed as indicated at 27 in Figure 3. Associated with each of the slidable key pieces there is a frictional braking device comprising a spring member 28 mounted in depending relation from the cover plate 29 at the front of the machine, and it will therefore be seen that tension of said spring 28 against each of the key bars 19 will hold the key in the position to which it is set and yet also allow the same to be freely shifted as desired.

The several indicating discs 11 are held in proper spaced relation by sleeves or tubular pieces 30 and 31 (Figure 5) and as shown in Figures 1 and 4, the character wheels have been moved to show numerals nine minus three equal six (9—3=6) and any other selected numerals within the range of the five wheels may also be selected to appear. In like manner character wheels provided with letters may be made to spell out simple words and with this being done by the child himself, needing only simple suggestions from the teacher, it will be evident that the aforesaid purposes of the invention may be obtained.

It will be understood that the apparatus or mechanism herein disclosed is not limited to the details of construction shown and described, since the same may be varied without departing from the principles of the invention as defined by the claims.

What is claimed as new is:

1. An indicator mechanism of the character described comprising a suitable support, a shaft mounted on the support parallel with its base, a wheel journalled on said shaft and having characters marked on the perimeter thereof, a pinion carried by the wheel, and a rack bar for actuating said pinion slidably mounted on the support parallel with its base, substantially as set forth.

2. An indicator mechanism of the character described comprising a suitable support, a shaft mounted on the support, a wheel journalled on said shaft having a plurality of characters marked on the perimeter thereof, a pinion carried by said wheel, a key slidably mounted on the support, forwardly extending rack bar, a rack bar carried by said key engaging with said pinion, a track mounted upon said support adapted to guide and support said extending rack bar, and means on said track for limiting the forward movement of the key.

3. An indicator mechanism of the character described comprising a casing, a shaft mounted at the rear portion of the casing, a wheel journalled on said shaft having a plurality of characters marked on the primeter thereof, a key slidably mounted at the front end of the casing, a horizontal rack bar carried by said key and extending forwardly thereof engaging with said pinion, and means for supporting said forwardly extending rack bar adapted to limit the forward movement of said sliding key.

4. An indicator mechanism of the character described comprising a casing, a shaft mounted at the rear of the casing, a plurality of wheels journalled in spaced relation on said shaft having characters marked on the perimeters thereof, a pinion carried by each of said wheels, a plurality of keys slidably mounted at the front portion of the casing, a plurality of rack bars carried by said keys engaging with said pinion respectively, and means limiting the forward movement of said keys.

5. An indicator mechanism of the character described comprising a casing having a horizontal base portion at the front thereof, a shaft on the casing at the rear thereof, a plurality of wheels journalled on said shaft in spaced relation and having characters marked on the perimeters thereof, a plurality of pinions carried by said character wheels respectively, a plurality of key bars slidably mounted on the horizontal portion of the casing, a plurality of apertured bars carried by said keys and engaging with said pinions respectively, and a frictional braking device for each of said keys, substantially as set forth.

6. An indicator mechanism of the character described comprising a casing having a horizontal ledge portion at the front thereof, a shaft mounted on the casing at the rear thereof, a plurality of disc wheels journalled on the shaft and having characters marked on the perimeters thereof, a plurality of pinions carried by said disc wheels and spaced respectively from the side edges of adjacent disc wheels, a bank of key bars slidably mounted on the horizontal ledge portion of the casing and having operative connection with the pinions of said discs respectively, and a frictional braking device associated with each of said key bars, substantially as set forth.

7. An indicator mechanism of the character described comprising a casing having a horizontal shelf portion at the front thereof, a shaft mounted in said casing at the rear portion thereof, a plurality of discs journalled in spaced relation on said shaft, a plurality of pinions carried by said discs, a bank of keys slidably mounted in spaced relation on said shelf portion, a frictional braking device for said keys respectively, and horizontal metallic strips carried by said keys having apertured portions engaging with the pinions of said discs, substantially as set forth.

8. An indicator mechanism of the character described comprising a casing having a horizontal base shelf portion, a shaft mounted in the casing, a disc wheel journalled on said shaft and having a plurality of characters marked on the perimeter thereof, a notched disc mounted on said disc wheel in spaced relation therefrom, and a key member having an apertured and horizontal strip portion slidably mounted on said horizontal base portion and engaging with said notched disc for actuating the character disc, substantially as set forth.

9. An indicator mechanism of the character described comprising a casing having a horizontal base portion, a shaft mounted in the casing, a disc wheel journalled on said shaft having characters marked on the perimeter thereof, a notched disc mounted on said character disc and in spaced relation therefrom, a key bar slidably mounted on said horizontal base portion of the casing, and a horizontal strip member carried by said key having apertures in gearing relation with said notched disc of the character wheel, substantially as set forth.

10. An indicator mechanism of the character described comprising a casing having a horizontal base portion, a shaft journalled in the casing, a key slidably mounted on said horizontal base portion, guiding members for said key, a notched disc mounted on said character disc in spaced relation thereto, a horizontal and apertured strip carried by said key bar in gearing relation with said notched discs of the character disc, a supporting track for said apertured bar located adjacent the notched discs, and a friction braking device for the key, substantially as set forth.

WALTER B. SWINDELL.